United States Patent
Rao et al.

(10) Patent No.: US 10,348,563 B2
(45) Date of Patent: Jul. 9, 2019

(54) SYSTEM-ON-CHIP (SOC) OPTIMIZATION THROUGH TRANSFORMATION AND GENERATION OF A NETWORK-ON-CHIP (NOC) TOPOLOGY

(71) Applicant: NetSpeed Systems, Inc., San Jose, CA (US)

(72) Inventors: Nishant Rao, San Jose, CA (US); Sailesh Kumar, San Jose, CA (US); Pier Giorgio Raponi, San Jose, CA (US)

( * ) Notice: Subject to any disclaimer, the term of this patent is extended or adjusted under 35 U.S.C. 154(b) by 0 days.

(21) Appl. No.: 15/944,653

(22) Filed: Apr. 3, 2018

(65) Prior Publication Data
US 2018/0227180 A1    Aug. 9, 2018

Related U.S. Application Data

(63) Continuation-in-part of application No. 14/625,132, filed on Feb. 18, 2015, now Pat. No. 10,050,843.
(Continued)

(51) Int. Cl.
*H04L 12/24* (2006.01)
*G06F 15/78* (2006.01)
(Continued)

(52) U.S. Cl.
CPC .......... *H04L 41/0826* (2013.01); *G06F 15/76* (2013.01); *G06F 15/7825* (2013.01);
(Continued)

(58) Field of Classification Search
CPC ... H04L 41/0826; H04L 41/12; H04L 45/121; G06F 15/7825; G06F 13/14;
(Continued)

(56) References Cited

U.S. PATENT DOCUMENTS

| 4,409,838 A | 10/1983 | Schomberg |
| 4,933,933 A | 6/1990 | Dally et al. |

(Continued)

FOREIGN PATENT DOCUMENTS

| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.
(Continued)

*Primary Examiner* — Naum Levin
(74) *Attorney, Agent, or Firm* — Spectrum IP Law Group LLC

(57) ABSTRACT

The present disclosure is directed to system-on-chip (SoC) optimization through transformation and generation of a network-on-chip (NoC) topology. The present disclosure enables transformation from physical placement to logical placement to satisfy bandwidth requirements while maintaining lowest area and lowest routing with minimum cost (wiring and buffering) and latency. In an aspect, method according to the present application includes the steps of receiving at least a floor plan description of an System-on-Chips (SoCs), transforming said floor plan description into at least one logical grid layout of one or more rows and one or more columns, optimizing a number of said one or more rows and said one or more columns based at least on any or combination of a power, an area, or a performance to obtain an optimized transformed logical grid layout, and generating said Network-on-Chip (NoC) topology at least from said optimized transformed logical grid layout.

18 Claims, 16 Drawing Sheets

Related U.S. Application Data

(60) Provisional application No. 62/634,015, filed on Feb. 22, 2018.

(51) Int. Cl.
    *G06F 17/50* (2006.01)
    *G06F 15/76* (2006.01)

(52) U.S. Cl.
    CPC ...... *G06F 17/5068* (2013.01); *G06F 17/5072* (2013.01); *H04L 41/12* (2013.01); *G06F 2213/0038* (2013.01); *G06F 2217/78* (2013.01); *Y02D 10/14* (2018.01)

(58) Field of Classification Search
    CPC ......... G06F 2213/0038; G06F 17/5072; G06F 17/5068; G06F 15/76; G06F 2217/78; Y02D 10/14
    See application file for complete search history.

(56) References Cited

U.S. PATENT DOCUMENTS

| | | | |
|---|---|---|---|
| 5,105,424 A | 4/1992 | Flaig et al. | |
| 5,163,016 A | 11/1992 | Har'El et al. | |
| 5,355,455 A | 10/1994 | Hilgendorf et al. | |
| 5,432,785 A | 7/1995 | Ahmed et al. | |
| 5,563,003 A | 10/1996 | Suzuki et al. | |
| 5,583,990 A | 12/1996 | Birrittella et al. | |
| 5,588,152 A | 12/1996 | Dapp et al. | |
| 5,764,740 A | 6/1998 | Holender | |
| 5,790,554 A | 8/1998 | Pitcher et al. | |
| 5,859,981 A | 1/1999 | Levin et al. | |
| 5,991,308 A | 11/1999 | Fuhrmann et al. | |
| 5,999,530 A | 12/1999 | LeMaire et al. | |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |
| 6,377,543 B1 | 4/2002 | Grover et al. | |
| 6,415,282 B1 | 7/2002 | Mukherjea et al. | |
| 6,674,720 B1 | 1/2004 | Passint et al. | |
| 6,701,361 B1 | 3/2004 | Meier | |
| 6,711,717 B2 | 3/2004 | Nystrom et al. | |
| 6,778,531 B1 | 8/2004 | Kodialam et al. | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,318,214 B1 | 1/2008 | Prasad et al. | |
| 7,379,424 B1 | 5/2008 | Krueger | |
| 7,437,518 B2 | 10/2008 | Tsien | |
| 7,444,424 B1 * | 10/2008 | Tourancheau .... G06F 15/17337 370/359 |
| 7,461,236 B1 | 12/2008 | Wentzlaff | |
| 7,509,619 B1 | 3/2009 | Miller et al. | |
| 7,564,865 B2 | 7/2009 | Radulescu | |
| 7,583,602 B2 | 9/2009 | Bejerano et al. | |
| 7,590,959 B2 | 9/2009 | Tanaka | |
| 7,693,064 B2 | 4/2010 | Thubert et al. | |
| 7,701,252 B1 | 4/2010 | Chow et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,830,905 B2 * | 11/2010 | Scott ............. G06F 15/17362 370/386 |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,018,249 B2 | 9/2011 | Koch et al. | |
| 8,020,163 B2 | 9/2011 | Nollet et al. | |
| 8,020,168 B2 | 9/2011 | Hoover et al. | |
| 8,050,256 B1 | 11/2011 | Bao et al. | |
| 8,059,551 B2 | 11/2011 | Milliken | |
| 8,098,677 B1 | 1/2012 | Pleshek et al. | |
| 8,099,757 B2 | 1/2012 | Riedle et al. | |
| 8,136,071 B2 | 3/2012 | Solomon | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,427,980 B2 * | 4/2013 | McLaren ............... H04L 41/12 370/254 |
| 8,438,578 B2 | 5/2013 | Hoover et al. | |
| 8,448,102 B2 | 5/2013 | Kornachuk et al. | |
| 8,490,110 B2 | 7/2013 | Hoover et al. | |
| 8,492,886 B2 | 7/2013 | Or-Bach et al. | |
| 8,503,445 B2 | 8/2013 | Lo | |
| 8,514,889 B2 | 8/2013 | Jayasimha | |
| 8,541,819 B1 | 9/2013 | Or-Bach et al. | |
| 8,543,964 B2 | 9/2013 | Ge et al. | |
| 8,572,353 B1 | 10/2013 | Bratt et al. | |
| 8,601,423 B1 | 12/2013 | Philip et al. | |
| 8,614,955 B2 | 12/2013 | Gintis et al. | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 | 3/2014 | Kumar et al. | |
| 8,705,368 B1 | 4/2014 | Abts et al. | |
| 8,711,867 B2 | 4/2014 | Guo et al. | |
| 8,717,875 B2 | 5/2014 | Bejerano et al. | |
| 8,726,295 B2 | 5/2014 | Hoover et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 8,819,611 B2 | 8/2014 | Philip et al. | |
| 8,819,616 B2 * | 8/2014 | Philip .............. G06F 17/5072 340/2.29 |
| 8,885,510 B2 | 11/2014 | Kumar et al. | |
| 9,185,023 B2 * | 11/2015 | Norige ................. H04L 45/06 |
| 9,210,048 B1 | 12/2015 | Marr et al. | |
| 9,223,711 B2 | 12/2015 | Philip et al. | |
| 9,244,845 B2 | 1/2016 | Rowlands et al. | |
| 9,244,880 B2 | 1/2016 | Philip et al. | |
| 9,253,085 B2 | 2/2016 | Kumar et al. | |
| 9,294,354 B2 | 3/2016 | Kumar | |
| 9,294,419 B2 * | 3/2016 | Hasenplaugh .......... H04L 41/12 |
| 9,319,232 B2 | 4/2016 | Kumar | |
| 9,444,702 B1 | 9/2016 | Raponi et al. | |
| 9,471,726 B2 | 10/2016 | Kumar et al. | |
| 9,473,359 B2 | 10/2016 | Kumar et al. | |
| 9,473,388 B2 | 10/2016 | Kumar et al. | |
| 9,473,415 B2 | 10/2016 | Kumar | |
| 9,477,280 B1 | 10/2016 | Gangwar et al. | |
| 9,529,400 B1 | 12/2016 | Kumar et al. | |
| 9,535,848 B2 | 1/2017 | Rowlands et al. | |
| 9,568,970 B1 | 2/2017 | Kaushal et al. | |
| 9,569,579 B1 | 2/2017 | Kumar | |
| 9,571,341 B1 | 2/2017 | Kumar et al. | |
| 9,571,402 B2 | 2/2017 | Kumar et al. | |
| 9,571,420 B2 | 2/2017 | Kumar | |
| 9,590,813 B1 | 3/2017 | Kumar et al. | |
| 9,660,942 B2 | 5/2017 | Kumar | |
| 9,699,079 B2 | 7/2017 | Chopra et al. | |
| 9,703,707 B2 * | 7/2017 | Falsafi ............... G06F 12/0813 |
| 9,742,630 B2 | 8/2017 | Philip et al. | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2002/0150094 A1 | 10/2002 | Cheng et al. | |
| 2003/0005149 A1 | 1/2003 | Haas et al. | |
| 2003/0088602 A1 | 5/2003 | Dutta et al. | |

(56) References Cited

U.S. PATENT DOCUMENTS

| | | |
|---|---|---|
| 2003/0145314 A1 | 7/2003 | Nguyen et al. |
| 2003/0200315 A1 | 10/2003 | Goldenberg et al. |
| 2004/0006584 A1 | 1/2004 | Vandeweerd |
| 2004/0019814 A1 | 1/2004 | Pappalardo et al. |
| 2004/0049565 A1 | 3/2004 | Keller et al. |
| 2004/0103218 A1 | 5/2004 | Blumrich et al. |
| 2004/0156376 A1 | 8/2004 | Nakagawa |
| 2004/0156383 A1 | 8/2004 | Nakagawa et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0228930 A1 | 10/2005 | Ning et al. |
| 2005/0286543 A1 | 12/2005 | Coppola et al. |
| 2006/0002303 A1 | 1/2006 | Bejerano et al. |
| 2006/0031615 A1 | 2/2006 | Bruce et al. |
| 2006/0053312 A1 | 3/2006 | Jones et al. |
| 2006/0075169 A1 | 4/2006 | Harris et al. |
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0333099 A1 | 12/2010 | Kupferschmidt et al. |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 12/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |

(56) References Cited

U.S. PATENT DOCUMENTS

| | | |
|---|---|---|
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Yoshida et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Nooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0359641 A1 | 12/2014 | Clark et al. |
| 2014/0376569 A1 | 12/2014 | Philip et al. |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063634 A1* | 3/2017 | Norige .................... H04L 45/06 |
| 2017/0063697 A1 | 3/2017 | Kumar |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

(56) References Cited

OTHER PUBLICATIONS

Grot, B., Preemptive Virtual Clock: A Flexible, Efficient, and Cost-Effective QOS Scheme for Networks-on-Chip, Micro '09, Dec. 16, 2009, 12 pgs.
Grot, B., Kilo-NOC: A Heterogeneous Network-on-Chip Architecture for Scalability and Service Guarantees, ISCA 11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA Memo 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B., et al., CoQoS: Coordinating QoS-Aware Shared Resources in NoC-based SoCs, J. Parallel Distrib. Comput., 71(5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 14, 2015, 5 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Sep. 8, 2016, 4 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 6 pages, untranslated, Japan Patent Office.

\* cited by examiner

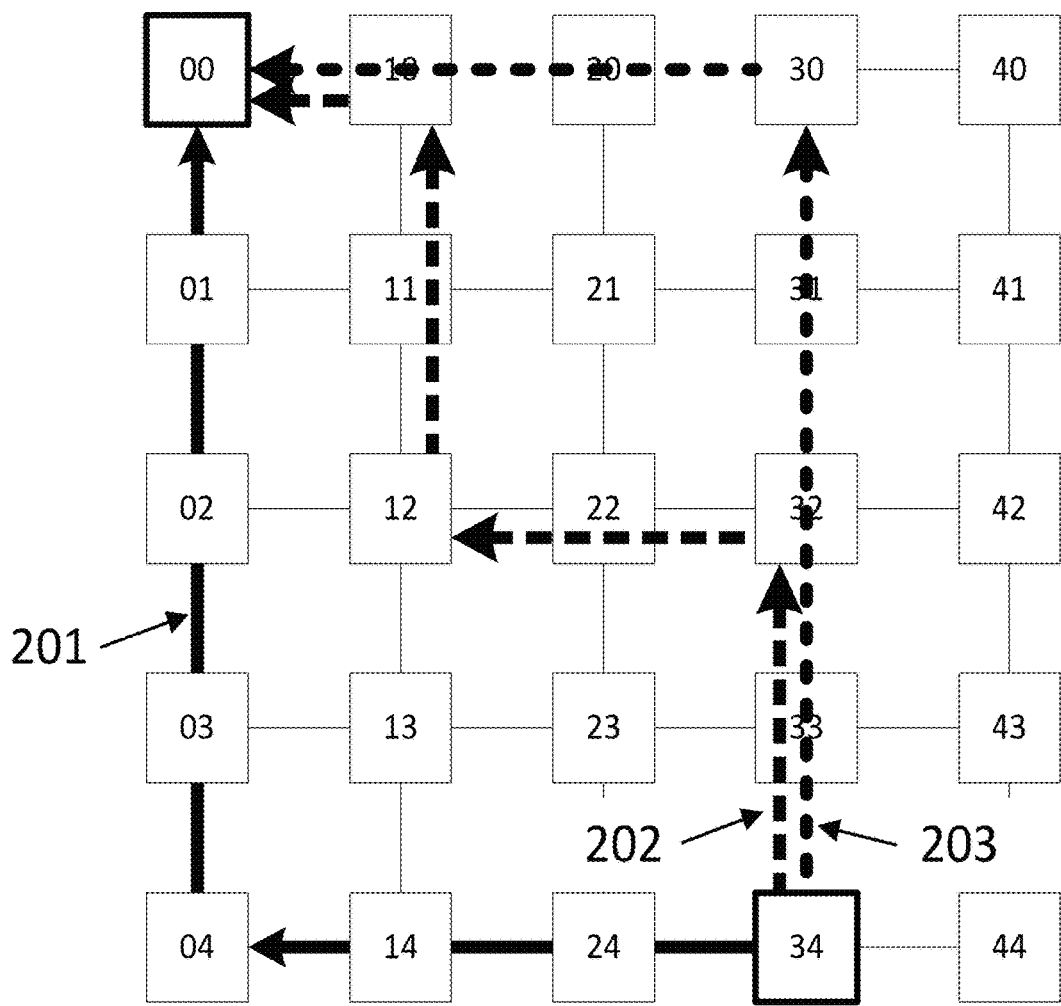

SYSTEM-ON-CHIP (SOC) OPTIMIZATION THROUGH TRANSFORMATION AND GENERATION OF A NETWORK-ON-CHIP (NOC) TOPOLOGY

CROSS REFERENCE TO RELATED APPLICATION

This U.S. patent application is a continuation in part application of U.S. patent application Ser. No. 14/625,132, filed on Feb. 18, 2015, now issued as U.S. Pat. No. 10,050,843, and is also based on and claims the benefit of domestic priority under 35 U.S.C. 119(e) from provisional U.S. patent application No. 62/634,015, filed on Feb. 22, 2018, the disclosures of which is hereby incorporated by reference herein in its entirety.

TECHNICAL FIELD

Methods and example implementations described herein are generally directed to an interconnect architecture, and more specifically, to system-on-chip (SoC) optimization through transformation and to automatically generate an optimized network-on-chip (NoC) topology for a given user specified physical topological constraints.

RELATED ART

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1A, 2-D (two dimensional) mesh (as shown in FIG. 1B), and 2-D Taurus (as shown in FIG. 1C) are examples of topologies in the related art. Mesh and Taurus can also be extended to 2.5-D (two and half dimensional) or 3-D (three dimensional) organizations. FIG. 1D shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router in the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. In addition to this, information such as position of various components such as bridges or ports on boundary of hosts, traffic information, chip size information, etc. may be supplied. A NoC compiler (topology generation engine) can then use this specification to automatically design a NoC for the SoC. A number of NoC compilers were introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters. Specifications can also be in the form of power specifications to define power domains, voltage domains, clock domains, and so on, depending on the desired implementation.

In large-scale networks, efficiency and performance/area tradeoff is of main concern. Mechanisms such as machine learning approach, simulated annealing, among others, provide optimized topology for a system. However, such complex mechanisms have substantial limitations as they involve certain algorithms to automate optimization of layout network, which may violate previously mapped flow's latency constraint or the latency constraint of current flow. Therefore, there is a need for systems and methods that significantly improve system efficiency by accurately indicating the best possible positions and configurations for hosts and ports within the hosts, along with indicating system level routes to be taken for traffic flows using the NoC interconnect architecture. Systems and methods are also required for automatically generating an optimized topology for a given SoC floor plan and traffic specification with an efficient layout. Systems and methods are also required for automatically transforming SoC floor plan and traffic specifications from physical placement into logical placement to satisfy bandwidth requirements while maintaining lowest area, lowest routing with minimum wiring and buffering cost, and latency.

Therefore, there exists a need for methods, systems, and computer readable mediums for overcoming the above-mentioned issues with existing implementations of generating topology for a given SoC.

SUMMARY

Methods and example implementations described herein are generally directed to an interconnect architecture, and more specifically, to system-on-chip (SoC) optimization through transformation and to automatically generate an optimized network-on-chip (NoC) topology for a given user specified physical topological constraints.

Aspects of the present disclosure relate to methods, systems, and computer readable mediums for overcoming the above-mentioned issues with existing implementations of generating topology for a given SoC by significantly improving system efficiency by accurately indicating the best possible positions and configurations for hosts and ports within the hosts, along with indicating system level routes to be taken for traffic flows using the NoC interconnect architecture. Further, methods, systems, and computer readable mediums automatically generate an optimized topology for a given SoC floor plan and traffic specification with an efficient layout. Furthermore, methods, systems, and computer readable mediums are also required for automatically transforming SoC floor plan and traffic specifications from physical placement into logical placement to satisfy bandwidth requirements while maintaining lowest area, lowest routing with minimum wiring and buffering cost, and latency.

An aspect of the present disclosure relates to a method for generating a Network-on-Chip (NoC) topology. The method includes the steps of receiving at least a floor plan description of a System-on-Chip (SoC), transforming said floor plan description into at least one logical grid layout of one or more rows and one or more columns, optimizing a number of said one or more rows and said one or more columns based at least on any or combination of a power, an area, or a performance to obtain an optimized transformed logical grid layout, and generating said Network-on-Chip (NoC) topology at least from said optimized transformed logical grid layout.

In an aspect, said floor plan description comprising any or combination of one or more positions of at least one host, one or more sizes of SoC, and one or more positions of at least one bridge.

In an aspect, said one or more rows and said one or more columns are determined at least from one or more corners associated with the host and/or said one or more positions of the host.

In an aspect, each intersection of said one or more rows and said one or more columns is indicative of at least a potential router location.

In an aspect, the method can further include the step of generating one or more connections on said optimized transformed logical grid layout based at least on overlapping hosts on one or more connection paths or bridges.

In an aspect, the method can further include the step of removing one or more connections on said optimized transformed logical grid layout based at least on overlapping hosts on one or more connection paths or bridges.

In an aspect, said one or more rows and said one or more columns are decided based on one or more domains, the one or more domains are selected from any or combination of a clock domain, a power domain, and a domain determined from physical constraints.

In an aspect, said floor plan description comprising traffic information, the number of said one or more rows and said one or more columns are optimized based on the traffic information. In an aspect, if a load of traffic is greater than 100% then said one or more rows and/or said one or more columns are added/merged (to increase the bandwidth). For example, if a load of traffic is greater than 100%, then candidate rows or columns can be merged if the combined load of traffic on candidate rows or columns to be merged is less than 50%. In another aspect, if a utilization of NoC channels on said one or more rows and/or one or more columns is greater than 100% then said one or more rows and/or said one or more columns are added, and if the combined utilization of NoC channels across multiple ones of said one or more rows and/or one or more columns is less than 100% then said one or more rows and/or said one or more columns are merged.

In an aspect, said step of optimizing is an iterative process involving tolerance.

In an aspect, said floor plan description comprising chip size information, the number of said one or more rows and said one or more columns are optimized based on the chip size information. In an aspect, wherein chip size information comprising information associated with a placement of one or more wires in a gap.

In an aspect, said floor plan description comprising router radix information and/or router arbitration frequency information, the number of said one or more rows and said one or more columns are optimized based on said router radix information and/or said router arbitration frequency information.

An aspect of the present disclosure relates to a system to generate a Network-on-Chip (NoC) topology. The system can include a receiving module a receiving module to receive at least a floor plan description of a System-on-Chip (SoC), a transformation module to transform said floor plan description into at least one logical grid layout of one or more rows and one or more columns, an optimization module to optimize a number of said one or more rows and said one or more columns based at least on any or combination of a power, an area, or a performance to obtain an optimized transformed logical grid layout, and an NoC generation module configured to generating said Network-on-Chip (NoC) topology at least from said optimized transformed logical grid layout.

In an aspect, said floor plan description comprising any or combination of one or more positions of at least one host, one or more sizes of SoC, and one or more positions of at least one bridge.

In an aspect, said one or more rows and said one or more columns are determined at least from one or more corners associated with the host and/or said one or more positions of the host.

In an aspect, each intersection of said one or more rows and said one or more columns is indicative of at least a potential router location.

In an aspect, said NoC generation module is further configured to generate one or more connections on said optimized transformed logical grid layout based at least on overlapping hosts on one or more connection paths or bridges.

In an aspect, said one or more rows and said one or more columns are decided based on one or more domains, the one or more domains are selected from any or combination of a clock domain, a power domain, or a performance domain.

In an aspect, said floor plan description comprising traffic information, the number of said one or more rows and said one or more columns are optimized based on the traffic information. In an aspect, if a load of traffic is greater than 100% then said one or more rows and/or said one or more columns are added/merged (to increase the bandwidth). For example, if a load of traffic is greater than 100%, then candidate rows or columns can be merged if the combined load of traffic on candidate rows or columns to be merged is less than 50%.

In an aspect, the number of said one or more rows and said one or more columns are optimized in an iterative manner involving tolerance.

In an aspect, said floor plan description comprising chip size information, the number of said one or more rows and said one or more columns are optimized based on the chip size information.

In an aspect, chip size information comprising information associated with a placement of one or more wires in a gap.

In an aspect, said floor plan description comprising router radix information and/or router arbitration frequency information, the number of said one or more rows and said one or more columns are optimized based on said router radix information and/or said router arbitration frequency information.

An aspect of the present disclosure relates to a non-transitory computer readable storage medium storing instructions for executing a process. The instructions include the steps of receiving at least a floor plan description of a System-on-Chip (SoC), transforming said floor plan description into at least one logical grid layout of one or more rows and one or more columns, optimizing a number of said one or more rows and said one or more columns based at least on any or combination of a power, an area, or a performance to obtain an optimized transformed logical grid layout, and generating said Network-on-Chip (NoC) topology at least from said optimized transformed logical grid layout.

BRIEF DESCRIPTION OF DRAWINGS

FIG. 2B illustrates three different routes between a source and destination nodes.

DETAILED DESCRIPTION

Figure 1A:
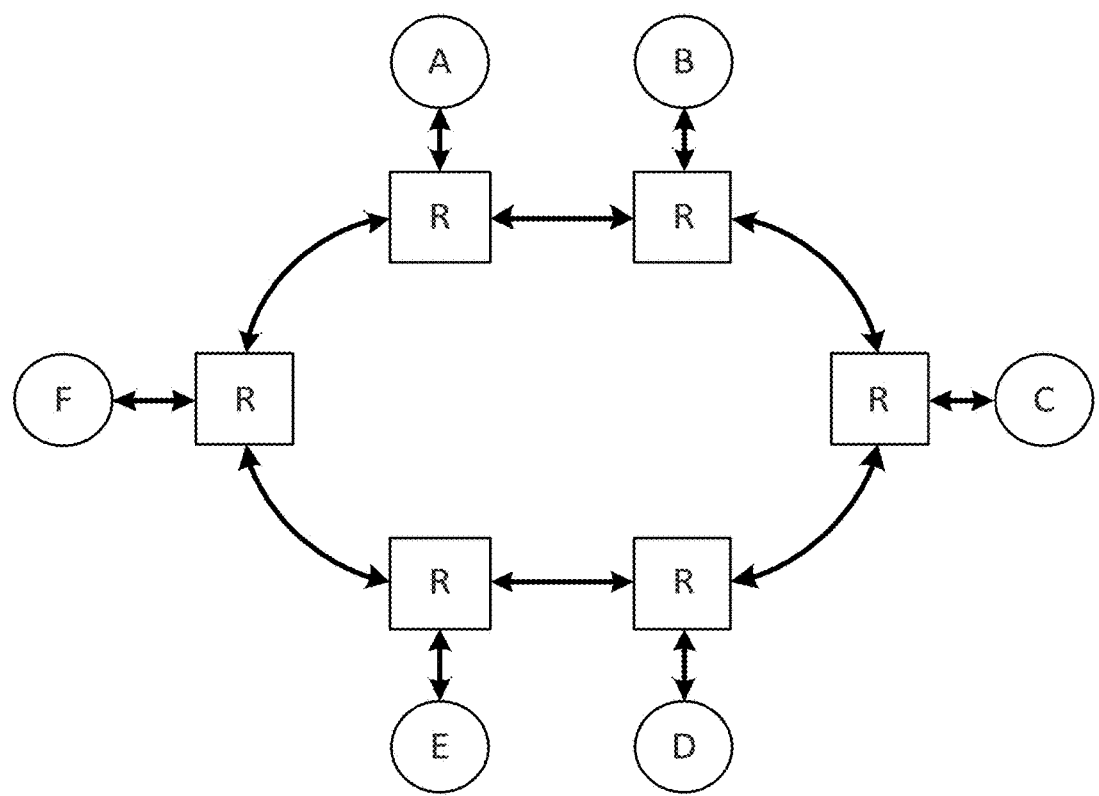
FIGS. 1A, 1B, 1C, and 1D illustrate examples of Bidirectional ring, 2D Mesh, 2D Taurus, and 3D Mesh NoC Topologies.
Figure 1B:
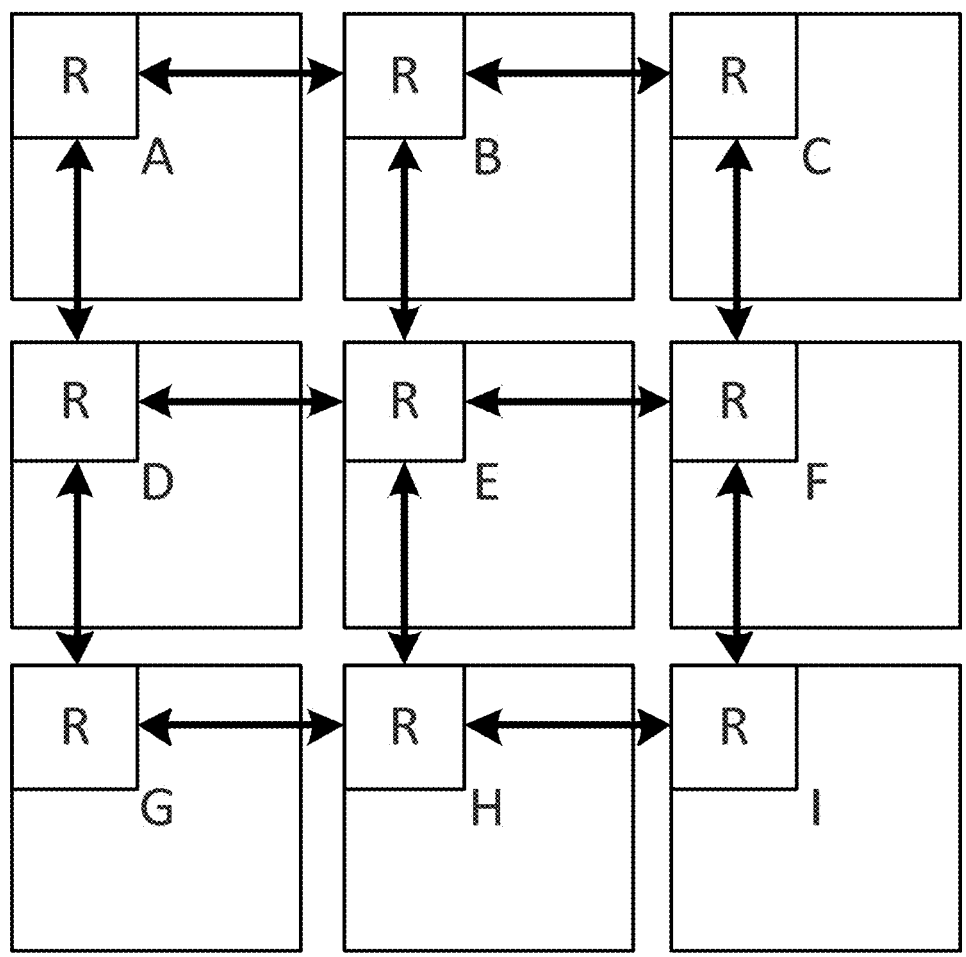
Figure 1C:
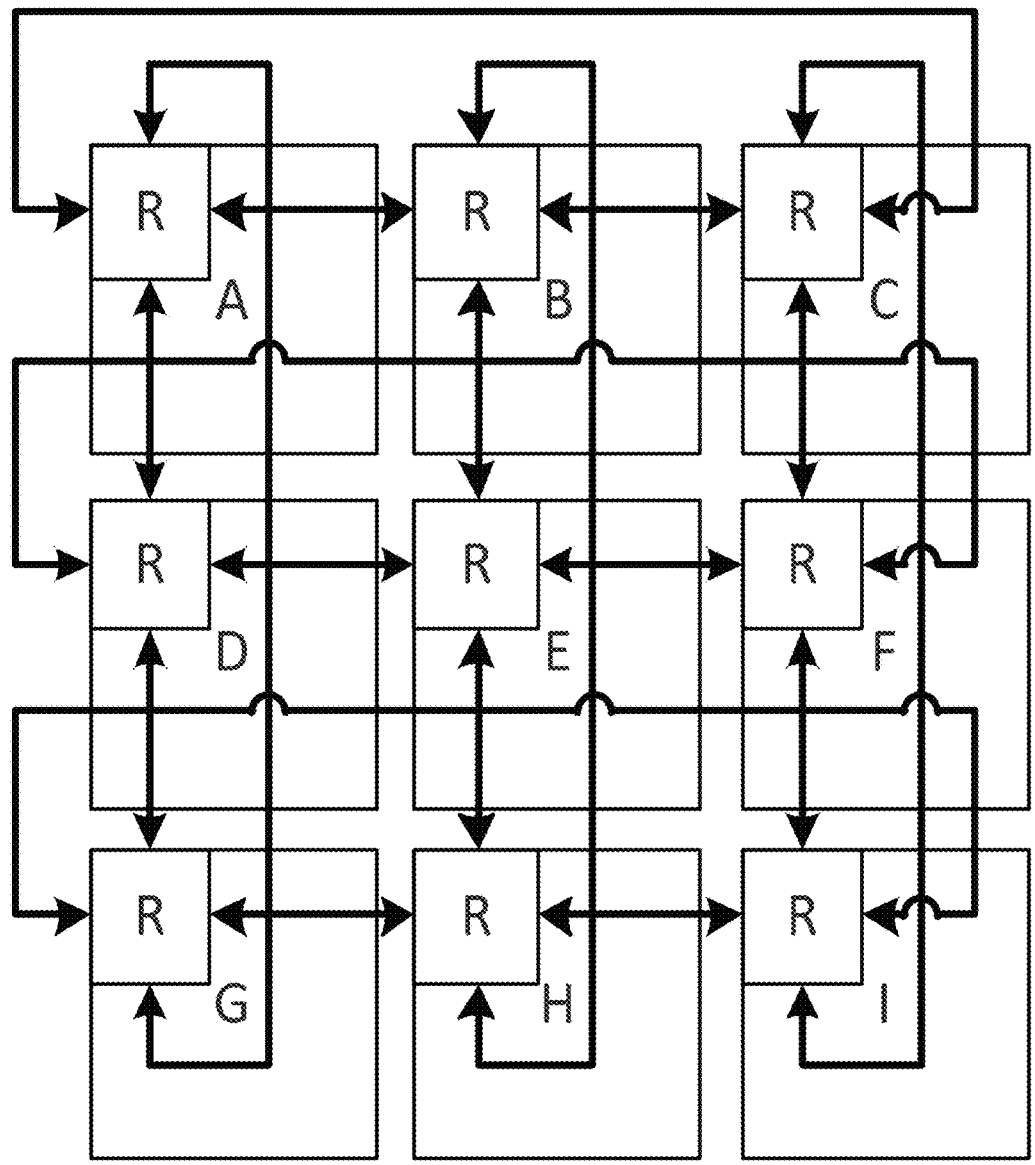
Figure 1D:
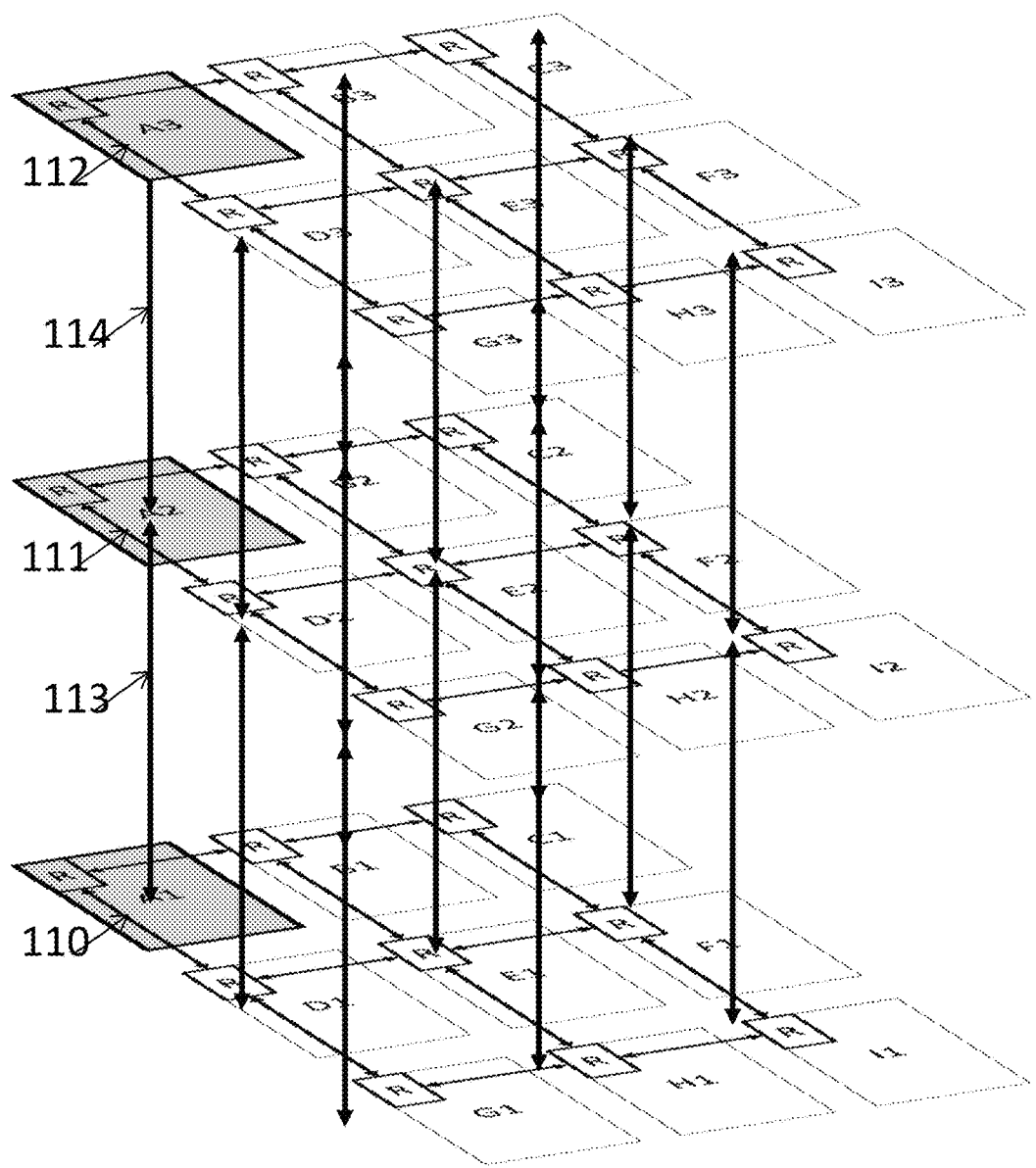
Figure 2A:
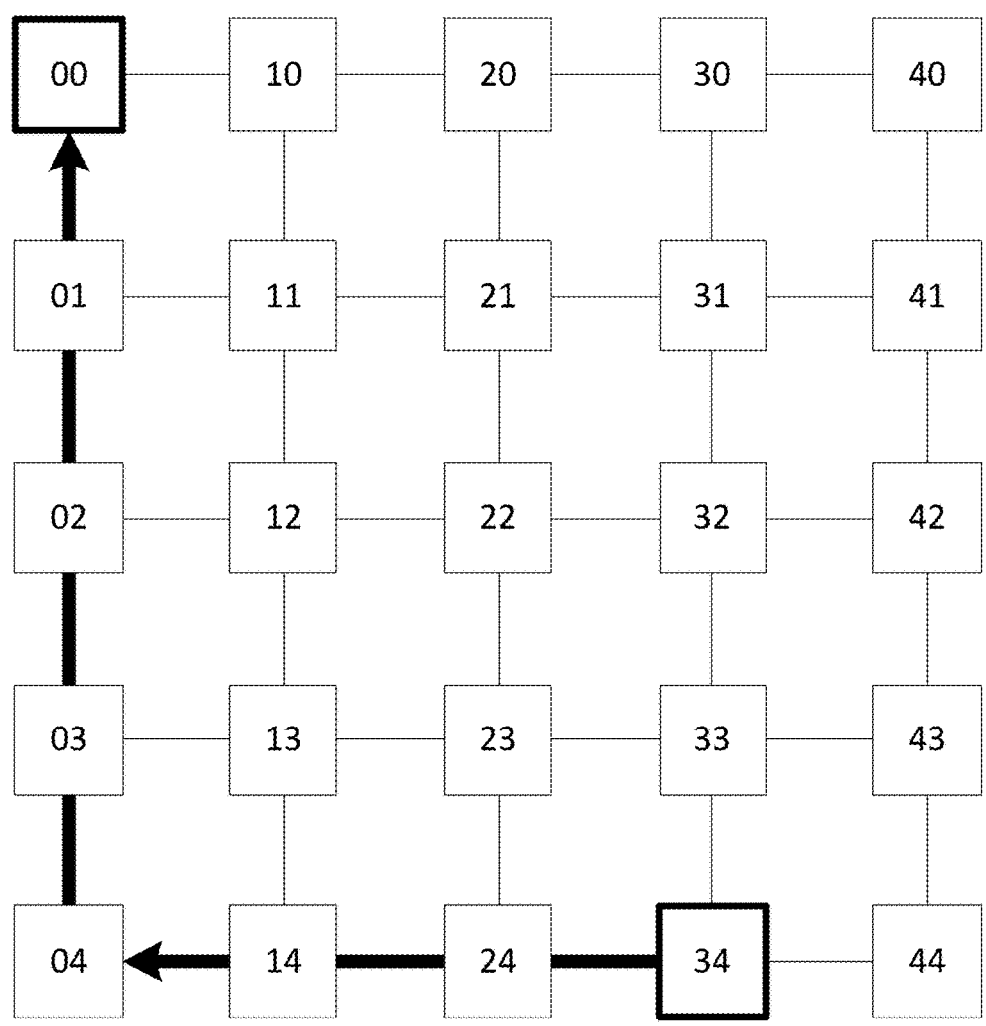
FIG. 2A illustrates an example of XY routing in a related art two dimensional mesh.
Figure 3A:
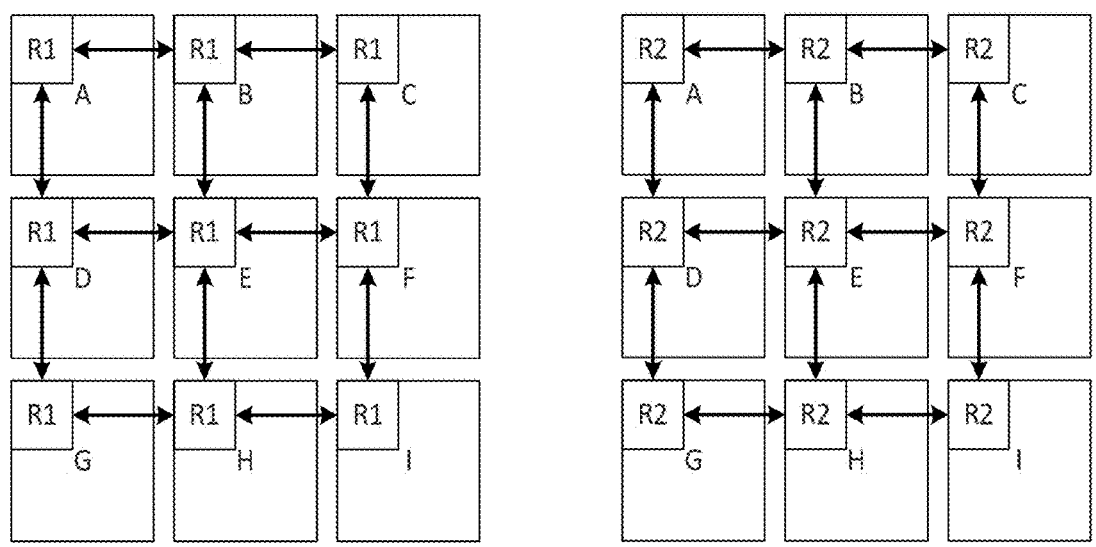
FIG. 3A illustrates an example of a related art two layer NoC interconnect.
Figure 3B:
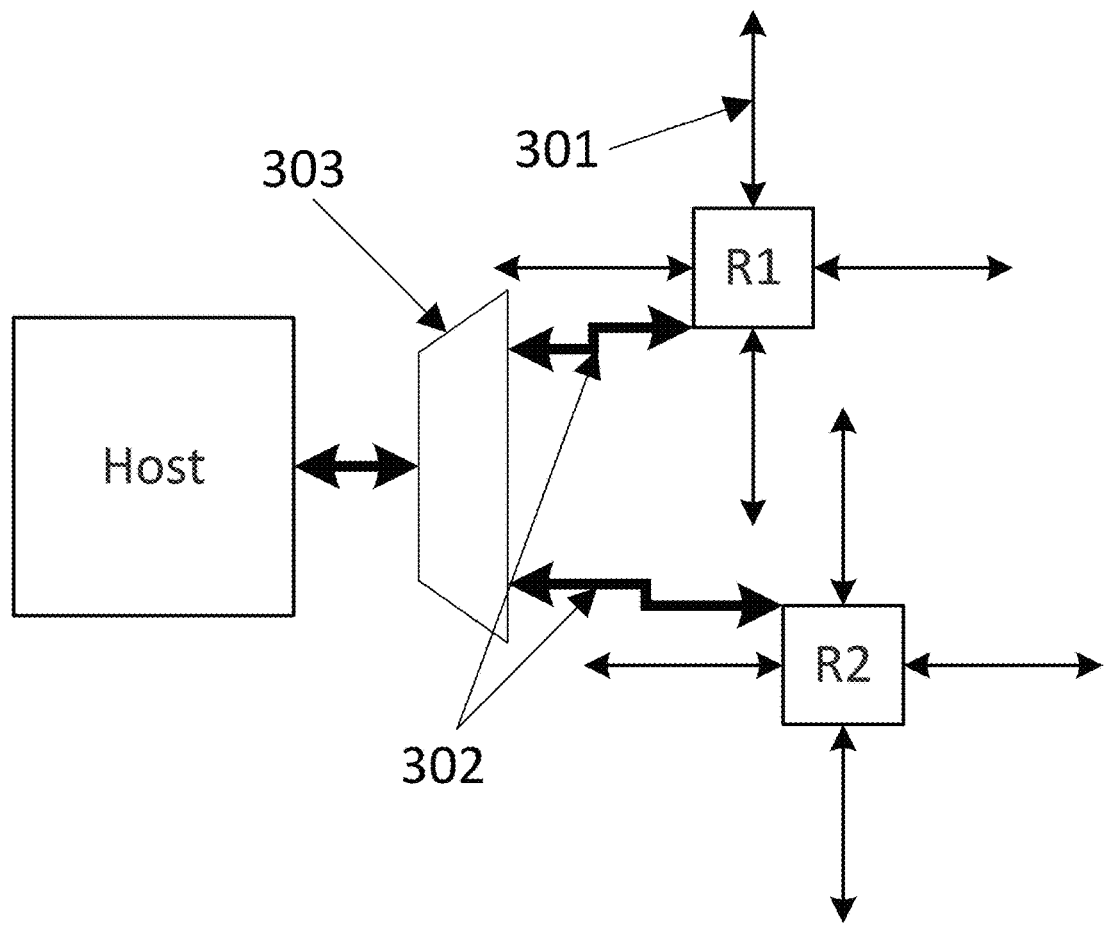
FIG. 3B illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Methods and example implementations described herein are generally directed to an interconnect architecture, and more specifically, to system-on-chip (SoC) optimization through transformation and to automatically generate an optimized network-on-chip (NoC) topology for a given user specified physical topological constraints.

Aspects of the present disclosure relate to methods, systems, and computer readable mediums for overcoming the above-mentioned issues with existing implementations of generating topology for a given SoC by improving system efficiency by accurately indicating the best possible positions and configurations for hosts and ports within the hosts, along with indicating system level routes to be taken for traffic flows using the NoC interconnect architecture. Further, methods, systems, and computer readable mediums automatically generate an optimized topology for a given SoC floor plan and traffic specification with an efficient layout. Furthermore, methods, systems, and computer readable mediums are also required for automatically transforming SoC floor plan and traffic specifications from physical placement into logical placement to satisfy bandwidth requirements while maintaining lowest area, lowest routing with minimum wiring and buffering cost, and latency. In this manner, an efficient NoC can be generated for a given SoC floorplan, thereby obviating the need to generate, test or manufacture multiple NoCs for a given SoC to implement a NoC for a SoC floorplan.

An aspect of the present disclosure relates to a method for generating a Network-on-Chip (NoC) topology. The method includes the steps of receiving at least a floor plan description of a System-on-Chip (SoC), transforming said floor plan description into at least one logical grid layout of one or more rows and one or more columns, optimizing a number of said one or more rows and said one or more columns based at least on any or combination of a power, an area, or a performance to obtain an optimized transformed logical grid layout, and generating said Network-on-Chip (NoC) topology at least from said optimized transformed logical grid layout.

In an aspect, said floor plan description comprising any or combination of one or more positions of at least one host, one or more sizes of SoC, and one or more positions of at least one bridge.

In an aspect, said one or more rows and said one or more columns are determined at least from one or more corners associated with the host and/or said one or more positions of the host.

In an aspect, each intersection of said one or more rows and said one or more columns is indicative of at least a potential router location.

In an aspect, the method can further include the step of generating one or more connections on said optimized transformed logical grid layout based at least on overlapping hosts on one or more connection paths or bridges.

In an aspect, the method can further include the step of removing one or more connections on said optimized transformed logical grid layout based at least on overlapping hosts on one or more connection paths or bridges.

In an aspect, said one or more rows and said one or more columns are decided based on one or more domains, the one or more domains are selected from any or combination of a clock domain, a power domain, and a domain determined from physical constraints.

In an aspect, said floor plan description comprising traffic information, the number of said one or more rows and said one or more columns are optimized based on the traffic information. In an aspect, if a load of traffic is greater than 100% then said one or more rows and/or said one or more columns are added/merged (to increase the bandwidth). For example, if a load of traffic is greater than 100%, then candidate rows or columns can be merged if the combined load of traffic on candidate rows or columns to be merged is less than 50%. In another aspect, if a utilization of NoC channels on said one or more rows and/or one or more columns is greater than 100% then said one or more rows and/or said one or more columns are added, and if the combined utilization of NoC channels across multiple ones of said one or more rows and/or one or more columns is less than 100% then said one or more rows and/or said one or more columns are merged.

In an aspect, said step of optimizing is an iterative process involving tolerance.

In an aspect, said floor plan description comprising chip size information, the number of said one or more rows and said one or more columns are optimized based on the chip size information. In an aspect, wherein chip size information comprising information associated with a placement of one or more wires in a gap.

In an aspect, said floor plan description comprising router radix information and/or router arbitration frequency information, the number of said one or more rows and said one or more columns are optimized based on said router radix information and/or said router arbitration frequency information.

An aspect of the present disclosure relates to a system to generate a Network-on-Chip (NoC) topology. The system can include a receiving module a receiving module to receive at least a floor plan description of a System-on-Chip (SoC), a transformation module to transform said floor plan description into at least one logical grid layout of one or more rows and one or more columns, an optimization module to optimize a number of said one or more rows and said one or more columns based at least on any or combination of a power, an area, or a performance to obtain an optimized transformed logical grid layout, and an NoC generation module configured to generating said Network-on-Chip (NoC) topology at least from said optimized transformed logical grid layout.

In an aspect, said floor plan description comprising any or combination of one or more positions of at least one host, one or more sizes of SoC, and one or more positions of at least one bridge.

In an aspect, said one or more rows and said one or more columns are determined at least from one or more corners associated with the host and/or said one or more positions of the host.

In an aspect, each intersection of said one or more rows and said one or more columns is indicative of at least a potential router location.

In an aspect, said NoC generation module is further configured to generate one or more connections on said optimized transformed logical grid layout based at least on overlapping hosts on one or more connection paths or bridges.

In an aspect, said one or more rows and said one or more columns are decided based on one or more domains, the one or more domains are selected from any or combination of a clock domain, a power domain, or a performance domain.

In an aspect, said floor plan description comprising traffic information, the number of said one or more rows and said one or more columns are optimized based on the traffic information. In an aspect, if a load of traffic is greater than 100% then said one or more rows and/or said one or more columns are added/merged (to increase the bandwidth). For example, if a load of traffic is greater than 100%, then candidate rows or columns can be merged if the combined load of traffic on candidate rows or columns to be merged is less than 50%.

In an aspect, the number of said one or more rows and said one or more columns are optimized in an iterative manner involving tolerance.

In an aspect, said floor plan description comprising chip size information, the number of said one or more rows and said one or more columns are optimized based on the chip size information.

In an aspect, chip size information comprising information associated with a placement of one or more wires in a gap.

In an aspect, said floor plan description comprising router radix information and/or router arbitration frequency information, the number of said one or more rows and said one or more columns are optimized based on said router radix information and/or said router arbitration frequency information.

An aspect of the present disclosure relates to a non-transitory computer readable storage medium storing instructions for executing a process. The instructions include the steps of receiving at least a floor plan description of a System-on-Chip (SoC), transforming said floor plan description into at least one logical grid layout of one or more rows and one or more columns, optimizing a number of said one or more rows and said one or more columns based at least on any or combination of a power, an area, or a performance to obtain an optimized transformed logical grid layout, and generating said Network-on-Chip (NoC) topology at least from said optimized transformed logical grid layout.

Figure 4A:
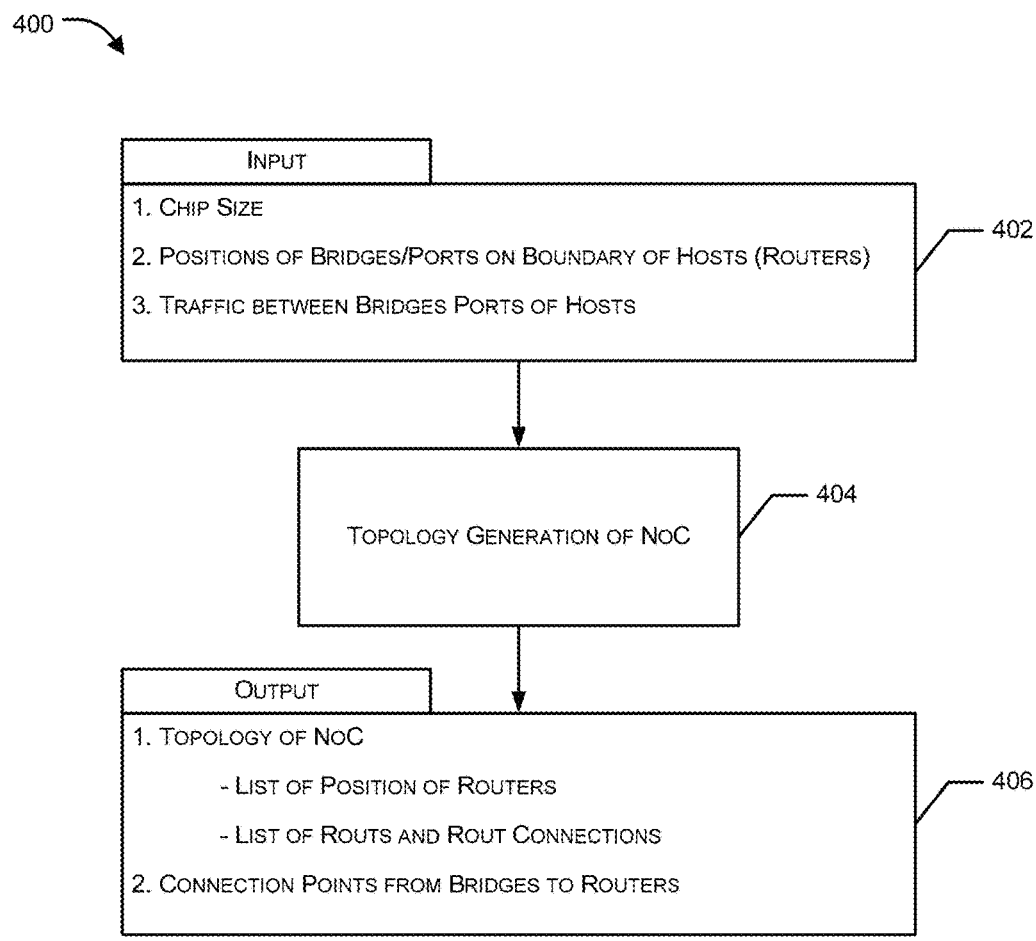
FIGS. 4A and 4B illustrate example flow diagram for overall process for generating a Network-on-Chip (NoC) topology.
Figure 4B:
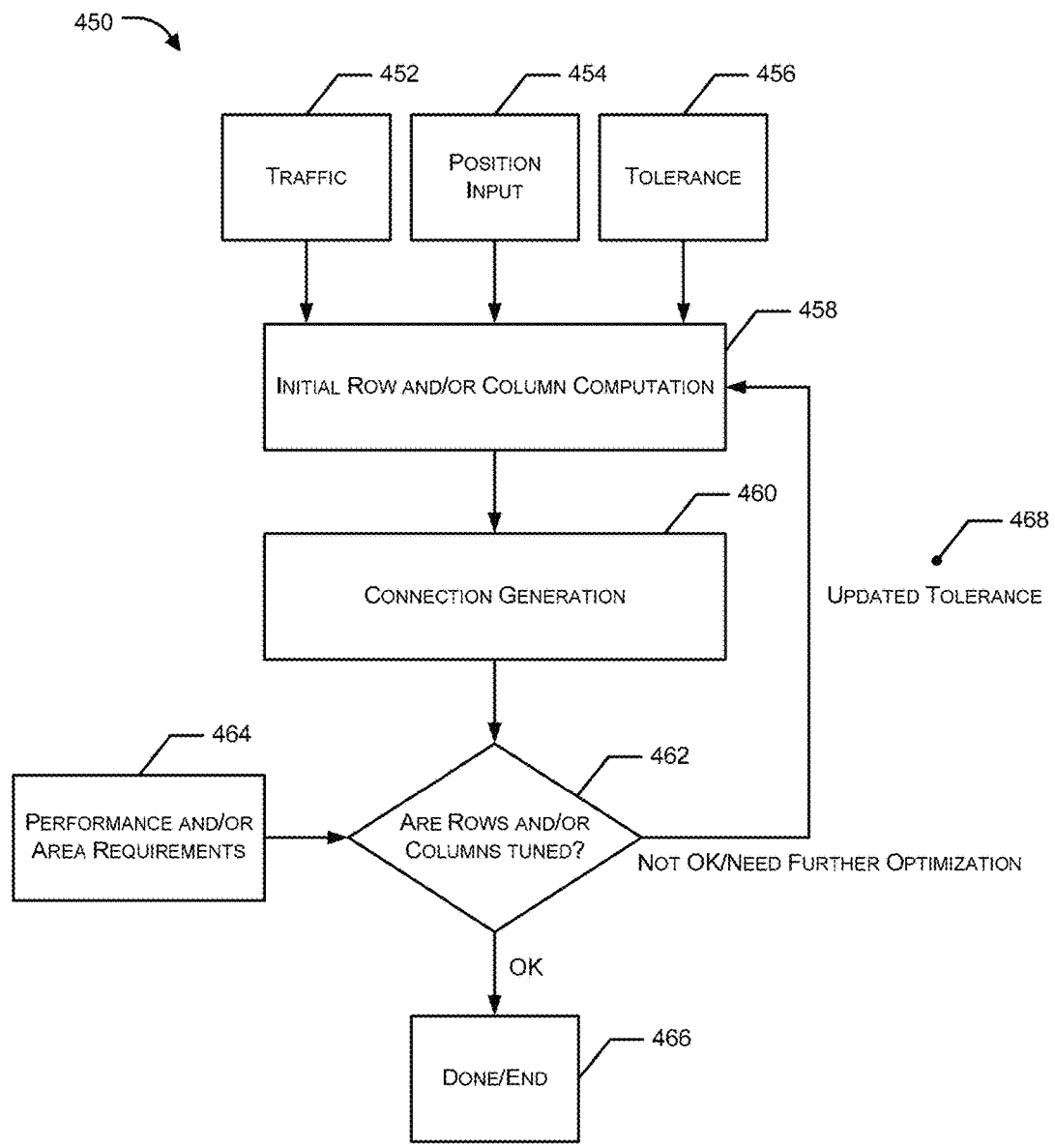

FIGS. 4A and 4B illustrate example flow diagram for overall process, for generating a Network-on-Chip (NoC) topology, for automatic generation of NoC from specified topological information/constraints based on projecting NoC elements onto a grid layout by projecting a plurality of nodes, a plurality of routers, and a plurality of links onto the grid layout based on the specified topological information, wherein the projected plurality of routers, the plurality of nodes, and the plurality of links are initially disabled, and then selectively enabling for at least one of the plurality of routers, the plurality of nodes, and the plurality of links on the grid layout based on one or more constraints for one or more layers of the NoC.

FIGS. 4A and 4B illustrates an example representation showing automatic generation of NoC from specified topological information/constraints based on projecting NoC elements onto a grid layout by projecting a plurality of nodes, a plurality of routers, and a plurality of links onto the grid layout based on the specified topological information, wherein the projected plurality of routers, the plurality of nodes, and the plurality of links are initially disabled, and then selectively enabling for at least one of the plurality of routers, the plurality of nodes, and the plurality of links on the grid layout based on one or more constraints for one or more layers of the NoC. The grid represents a plurality of routers and bridges that are configured on the grid initially, and then links there between are then selectively enabled between specific routers and/or bridges by activation of their links. For instance, although multiple routers and bridges have been configured, links for only links 402 and 404 have been activated. Once enabled, NoC agents can be provided on the enabled ones of the plurality of nodes of the grid layout and traffic can be provided between the provided NoC agents. In another aspect, traffic to the enabled ones of the plurality of routers and the plurality of links of the NoC can also be mapped.

As shown in FIG. 4A, in an implementation 400, a topology generation of NoC block 404, which can include an NoC compiler, receives various inputs associated with the physical placement to a coarse grain grid for NoC construction from an input block 402. In an example implementation, a number of NoC compilers are introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters.

In an example implementation, the input block 402 can provide information associated with a chip size as input along with positions of bridges, ports on boundary of hosts (router), and traffic information between bridges or ports of the hosts, as inputs.

Figure 5:
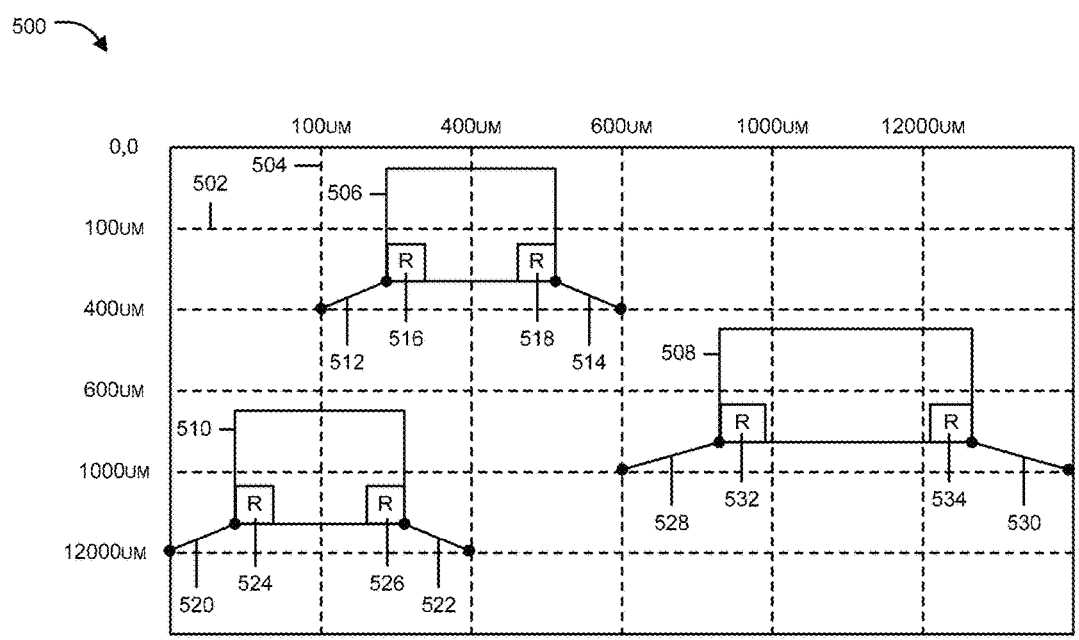
FIG. 5 illustrates example considerations for candidate rows and columns for generating a Network-on-Chip (NoC) topology.

In an implementation, the topology generations of NoC block 404 then use this specification to automatically design a NoC for the SoC. In an example implementation, the topology generation of NoC block 404 generates a topology of NoC having a list of positions associated with routers, and list of routers and associated route connections. Apart from the topology of NoC, the topology generation of NoC block 404 also generates connection points from bridges to routers (as shown in FIG. 5).

In an example implementation, by achieving the output at block 406, the implementations described herein optimizes bandwidth/latency constraints, cost (wire/buffer) constraints, timing of components, all traffic that has a path through NoC, radix limit of routers, channel widths, and etc.

Referring now to FIG. 4B, an example flow diagram 450 for overall process, for generating a Network-on-Chip (NoC) topology. As shown in FIG. 4B, in an implementation, a plurality of inputs, such as but not limited to, traffic 452 information, position input 454 associated with routers/hosts, and information associated with tolerance 456, are provided as input for computing initial rows and/or columns at block 458.

In an example implementation, the initial rows and/or columns computed at block 458 are provided for connection generation at block 460 which generates tuned/optimized rows and columns at block 462. The tuned/optimized rows and columns at block 462 while optimizing also considers performance and/or area requirement provided from block 464. If the rows and columns are the most optimized/tuned, the process is stopped at block 466. However, if the rows and columns are not most optimized/tuned, the updated tolerance 478 is provided as input and the rows and columns are processed to achieve most optimized/tuned rows and columns.

In an example implementation, the method according to the present disclosure enables to achieve SoC optimization through transformation and generation of NoC topology thereof. In an example implementation, the method according to the present disclosure enables to simplify the unnecessary details of the design to solve for latency and wire costs in the physical world. Since the output generated can accurately identify topology of NoC including list of positions for routers, list of router to router connections and Connection points from Bridges to Routers.

FIG. 5 illustrates example considerations for candidate rows and columns for generating a Network-on-Chip (NoC) topology. One should appreciate that the compression mechanisms disclosed herein are completely example in nature and any other technique can be used to create the flattened virtual grid, all of which are completely within the scope of the present disclosure.

In an implementation 500, FIG. 5 illustrates example representations showing automatic generation of NoC from specified topological information/constraints based on projecting NoC elements onto one or more grid layouts by projecting a plurality of routers, a plurality of links, and a plurality of NoC agents onto a grid layout based on one or more constraints for one or more layers of the NoC and the specified topological information, wherein grid sizes of the heterogeneous grid layout are derived from the specified topological information. As shown, original input layout of NoC agents 516, 518, 524, 526, 532, and 534 can be directly transitioned to an equal column width layout, wherein spacing along the X-axis (depicting grid sizes) is same and represents a homogeneous grid layout where the routers and/or the bridges are configured based on their configuration in terms of space, distance, position, and construction in the real space. Once arranged on the homogeneous grid layout, traffic can be provided between the plurality of NoC agents and the traffic can be mapped to the NoC.

In an example implementation, as shown the grid representation from the original input, wherein the representation shows a heterogeneous grid layout having different width sizes based on alignment, topological information/constraints, position, location, among other parameters of the NoC agent. As further shown, a heterogeneous grid layout can further be automatically converted into a grid layout by projecting an auto-determined grid on a plurality of routers, a plurality of links, and a plurality of NoC agents based on the specified topological information, and providing traffic between the plurality of NoC agents and mapping the traffic to the NoC. As show the representation comprises projection of router/bridge attributes such as location, construction, links, position, space, onto the auto-determined grid that has equal spacing and sizing as regards the X-axis. The present implementation therefore enables determination of the grid based on business specification based on real coordinate and not the grid coordinates, wherein based on different types of specifications, the proposed system automatically transitions the real space to a constrained grid.

In an example implementation, given a specification with hosts sizes, shapes, positions, ports and bridges (where bridges will be in terms of physical size (e.g., 10 um, 20 um, etc.)) the present disclosure enables to construct columns and rows that are in units of x um columns and y um rows.

In an example implementation, the columns and rows are formed from host corners, bridge positions, and domain corners. Differing domains cannot be merged.

In an example implementation, the present disclosure enables to mark every corner of a host as a column for shortest path routing (example, mark bridges at 100 um, 400 um, 570 um, 1000 um, 1700 um, 2000 umm, positions of all of the columns, which indicates maximum columns required.

In an example implementation, the present disclosure enables to shrink to the optimum value for the given traffic based on a tolerance (minimum width of a row or column), grid does not have to have equal size columns or rows, and each row or column can be its own size in accordance with the desired implementation. The tolerance also does not need to be the same for all rows or all columns, each row or each column can have its own tolerance depending on the desired implementation. For example, based on tolerance of 500 um, example implementations can start at a tolerance of 100 um, make widths 500 um, so 100, 400 and 570 are in the same column and connected to the same router. However, if router has insufficient ports, then it needs to be extended to another column with another router.

In an example implementation, the present disclosure enables to mark each row based on position of the bridges thereby reducing rows and columns to reduce area. User inputs a tolerance value whereas the present disclosure enables to calculate actual tolerance i.e., two tolerances.

In an example implementation, the present disclosure also enables to check all traffic that has a path through the NoC and radix limit of routers is not exceeded. If not, more columns are needed, and the bridges need to be spaced further apart. Accordingly, the present disclosure enables to determine actual tolerance for recalculating/re-computing rows/columns and checks if the NoC layout is optimized in nature.

In an example implementation, the NoC can be tuned to meet the smallest possible NOC to meet the performance. Accordingly, wires can be routed over blocks depending on number of layers available and how many layers the block occupies.

In an example implementation, as shown in FIG. 5, a plurality of routers 516, 518, 524, 526, 532, and 534 can be located in various columns 504 and various rows 502 as stated above (i.e., columns and rows that are in units of x um columns and y um rows) based on the positions of the hosts 506, 508, 510. Mark every corner of a host as a column for shortest path routing represented by 512, 514, 520, 522, 528 and 530. For example, bridges are marked at 100 um, 400 um, 570 um, 1000 um, 1700 um, 2000 um i.e., positions of all of the columns indicating maximum columns required.

In an example implementation, the columns and rows are formed from host corners, bridge positions, and domain corners. Differing domains cannot be merged.

Figure 6A:
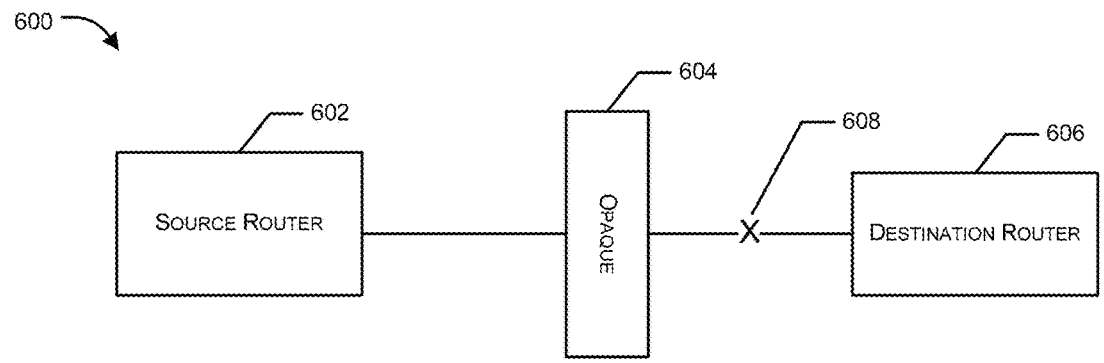
FIGS. 6A and 6B illustrate example process for determining connections for generating a Network-on-Chip (NoC) topology.
Figure 6B:
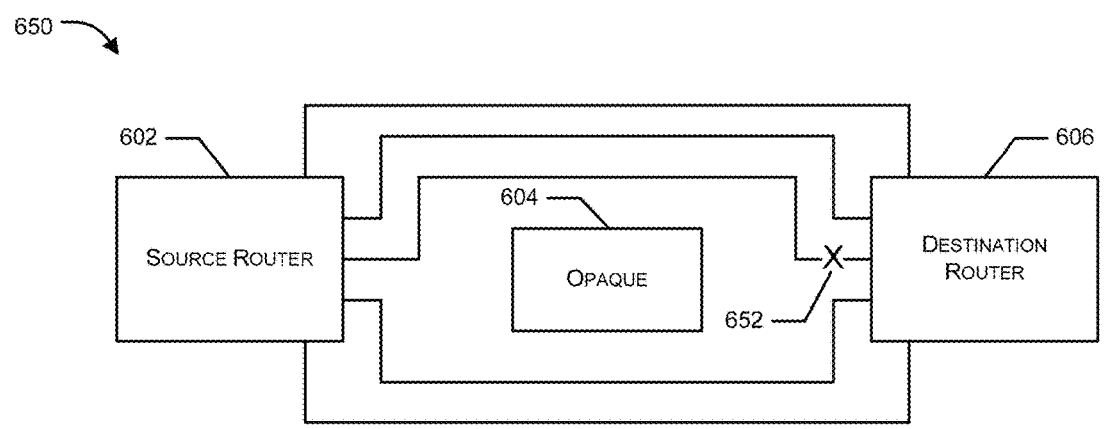

In an implementation, wires can be routed over blocks depending on number of layers available and how many layers the block occupies. FIGS. 6A and 6B illustrate example process for determining connections for generating a Network-on-Chip (NoC) topology.

In an example implementation, for determining connections, as shown in FIG. 6A 600 and FIG. 6B 650, if a wire 606 being initiated form source router 602 attempting to reach to a destination router 604 passes through an opaque (transparent and/or translucent) block 604 as shown in FIG. 6A, then according to the present disclosure, it should not be a permissible connection. Also, it is a possibility that the wire 652 routs around opaque (transparent and/or translucent) block 604 as shown in FIG. 6b, but if there is already rows routing above and below, then the present disclosure eliminates extra connections as for optimization purposes, there should be at most one wire routed around each edge of the IP.

Thus, the present disclosure facilitates the positioning of the hosts, the bridges and the boundaries of the hosts to transform the physical specification into a logical design for the SoC that has a grid structure fundamentally with some edges removed and with the bridges being connected to appropriate boundaries within that grid structure and that topology, and resulting in a topology that facilitates a NoC in some dimensional area. Accordingly, the host has ports connected to the bridge having its protocol translated into the protocol of the NoC, and ports are on the boundaries of the hosts.

Thus, the present disclosure achieves, transformation from physical placement to logical placement to satisfy bandwidth requirements while maintaining the lowest area and lowest routing with minimum cost (wiring and buffering) and latency.

Figure 7:
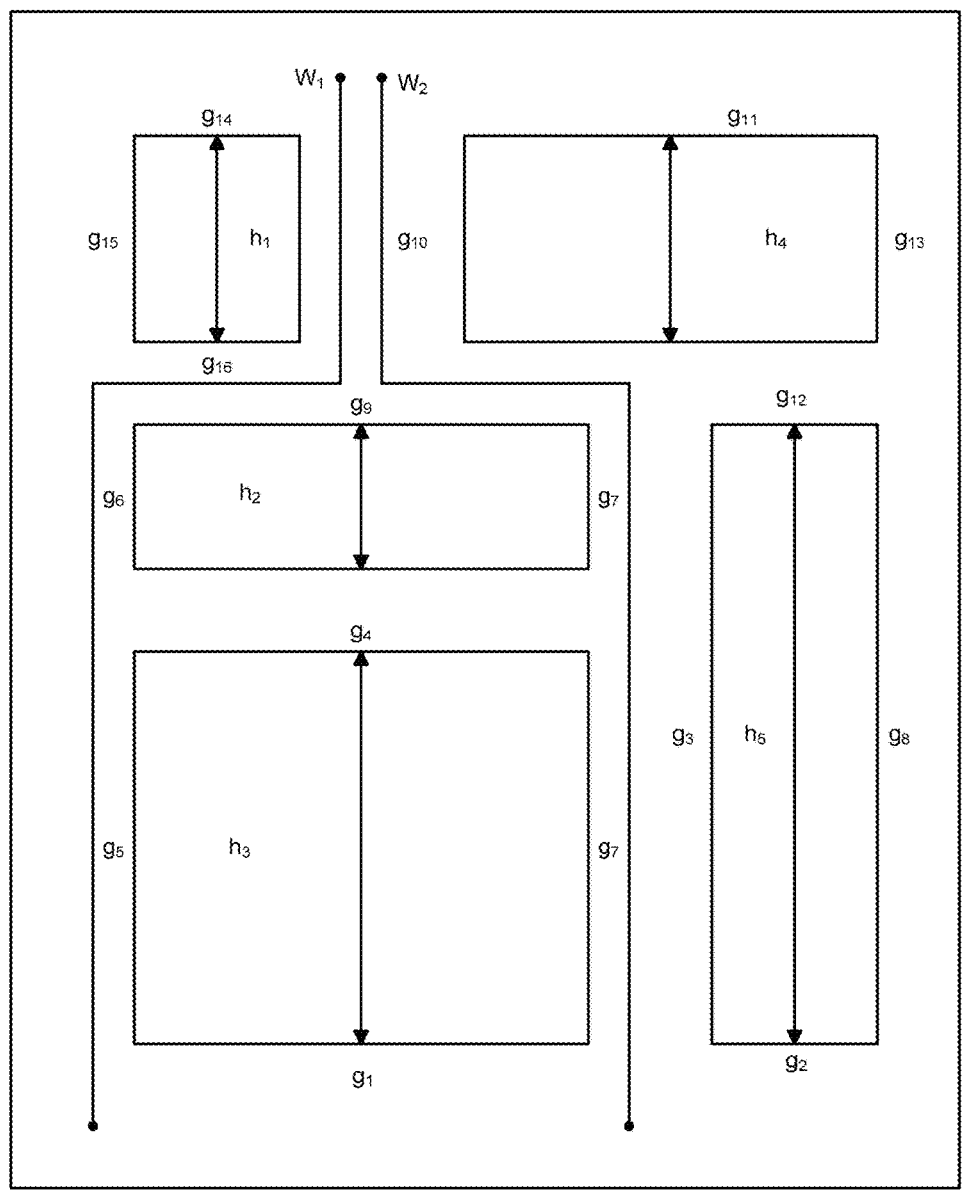
FIG. 7 illustrates an example chip size optimization for generating a Network-on-Chip (NoC) topology.

FIG. 7 illustrates an example chip size optimization for generating a Network-on-Chip (NoC) topology. In an implementation 700, the present disclosure facilitates various ways of chip optimization. In an example implementation, one method is without tolerance. In this method, in order to decide a performance optimization of the chip, example implementations start with a full mesh and then reduce number of rows and columns based on load on channels (e.g., if load is <5% for a particular part of the mesh, then merge the mesh as long as enough bisectional bandwidth and available connections). Further, columns can be added based on the bisectional bandwidth if needed. Example implementations can check the load of a channel, and if load is >100% then more columns are added, but if they have less than 100% load, then the columns or rows are merged to see if load is still <100%.

While doing the area optimization, through use of rows and columns, rows and columns can be split based on performance. Example methods to split the rows or columns can include dividing them evenly, through simulated annealing, or through other methods in accordance with the desired implementation.

In an example implementation, merging of rows or columns may be decided by comparing best possible merges based on desired criteria (e.g., peak load), and the merges of such rows or columns are conducted. For example, example implementations can examine n rows and m columns for n+m potential mergers, and traverse such mergers until merges are determined not to be good. Splitting of rows or columns can involve selecting the worst load or cost (e.g., by position, density) and then split.

In an example implementation, one method is with tolerance. In this method, tolerance includes the wiring cost, clock domains/power domains (places constraints as clock/power domains that are not the same type cannot be merged), and changing frequencies, voltage, and so on, when transformed into the logical layout. In example implementations the domains can be carried over so that every domain edge is a column and row.

In an example implementation, optimization of chip size can be based on gaps between each pair of hosts or between host and an edge of the chip. Gaps are wiring channels involving some number of wires that increases or decreases the size of the chip. Caches, routers, and other components of the NoC may also occupy space within the gaps. The present disclosure includes implementations to shrink dimensions by minimizing number of wires between each of the gaps, which may result in a reduced chip size.

In example, as shown in FIG. 7, a chip size layout of an un-optimized chip is illustrated. As shown in FIG. 7, g1-16 are various gaps that are present in the chip whereas h1-h5 is the widths of various routers. Wires W1-W2 passes through the gaps as shown in FIG. 7, such wiring further adds to the chip size. Gaps are wiring channels involving some number of wires that increases or decreases the size of the chip. Accordingly, a maximum width of the chip size can be calculated as combination of gaps present in the layout and widths of the each router. The actual width of any chip size can be obtained based at least on gaps between each pair of hosts or between host and an edge of the chip. The present disclosure can include implementations to shrink dimensions by minimizing number of wires between each of the gaps, thereby resulting in a reduced chip size.

Figure 8:
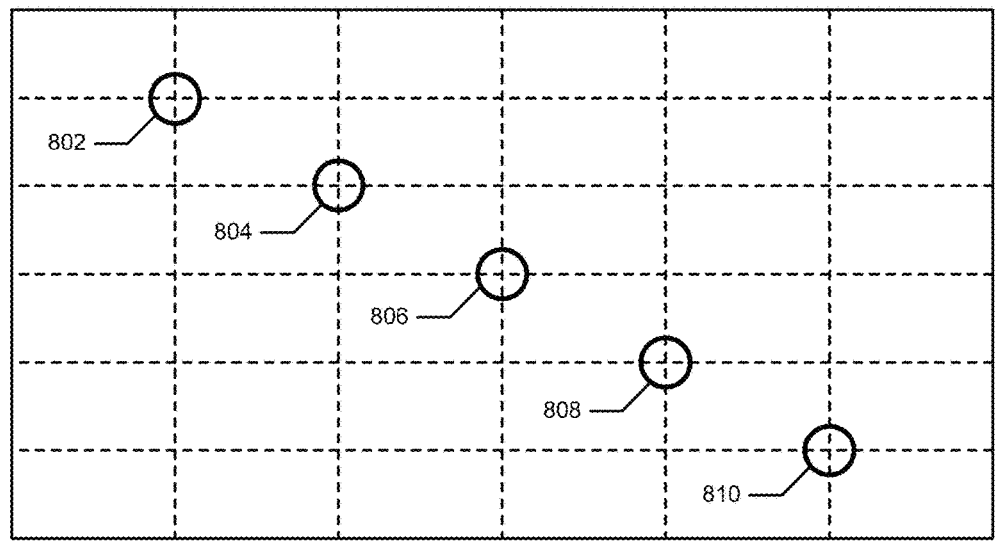
FIG. 8 illustrates an example row and/or column merger for generating a Network-on-Chip (NoC) topology.

FIG. 8 illustrates an example row and/or column merger for generating a Network-on-Chip (NoC) topology. In an example implementation 800, FIG. 8 shows rows and columns optimization based on various factors. In an example implementation, the columns and rows are formed from host corners, bridge positions, and domain corners. Differing domains cannot be merged.

As shown in FIG. 8, various hosts 802-810 can be present at various location, thus, if a load of traffic is greater than 100% then said one or more rows and/or said one or more columns are/merged (to increase the bandwidth). For example, if a load of traffic is greater than 100%, then candidate rows or columns can be merged if the combined load of traffic on candidate rows or columns to be merged is less than 50%.

Figure 9:
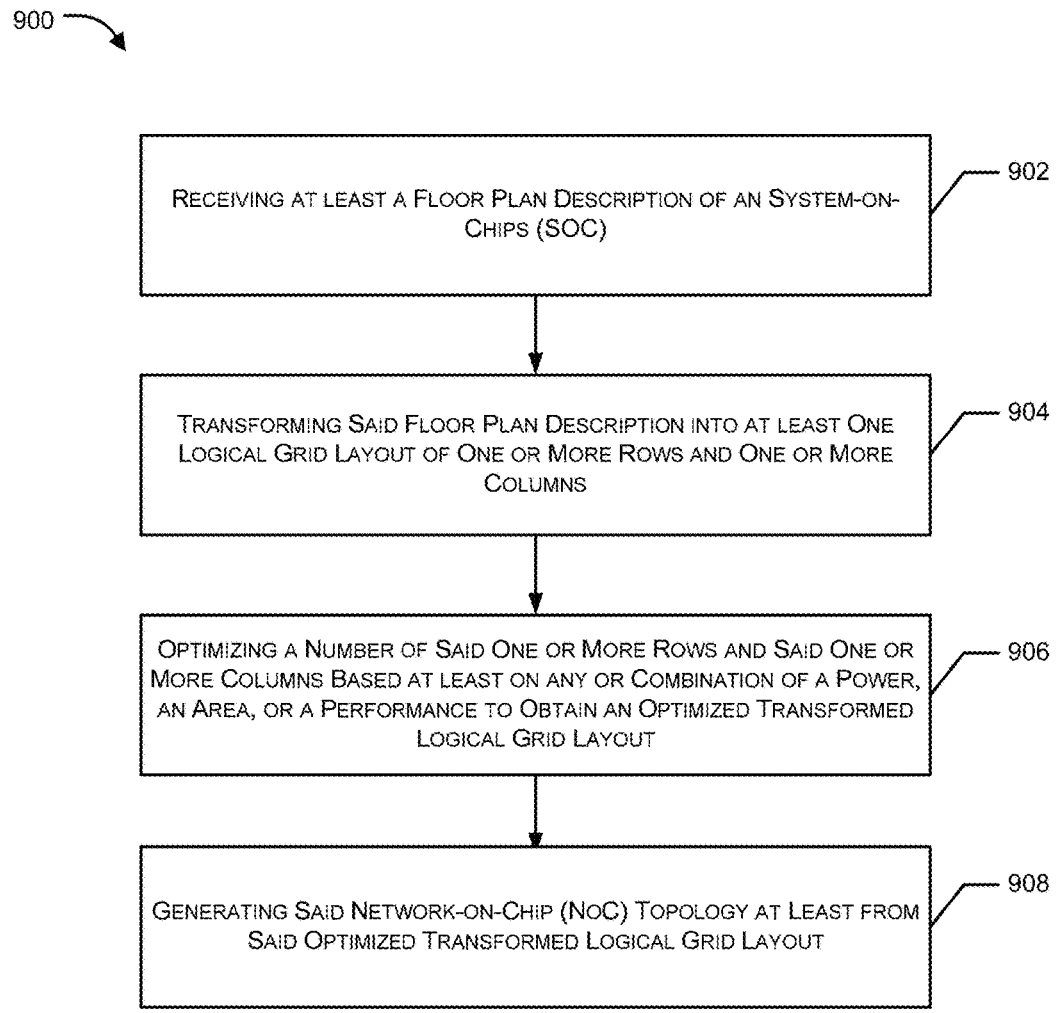
FIG. 9 illustrates an example flow diagram for generating a Network-on-Chip (NoC) topology.

FIG. 9 illustrates an example flow diagram 900 for generating a Network-on-Chip (NoC) topology. In an implementation, the present disclosure relates to a method for generating a Network-on-Chip (NoC) topology. The method at step 902 receives at least a floor plan description of a System-on-Chips (SoC). The method at step 904 transforms said floor plan description into at least one logical grid layout of one or more rows and one or more columns. The method at step 906 optimizes a number of said one or more rows and said one or more columns based at least on any or combination of a power, an area, or a performance to obtain an optimized transformed logical grid layout. The method at step 908 generates said Network-on-Chip (NoC) topology at least from said optimized transformed logical grid layout.

In an example implementation, said floor plan description comprising any or combination of one or more positions of at least one host, one or more sizes of SoC, and one or more positions of at least one bridge.

In an example implementation, said one or more rows and said one or more columns are determined at least from one or more corners associated with the host and/or said one or more positions of the host.

In an example implementation, each intersection of said one or more rows and said one or more columns is indicative of at least a potential router location.

In an example implementation, the method can further include the step of generating one or more connections on said optimized transformed logical grid layout based at least on overlapping hosts on one or more connection paths or bridges.

In an example implementation, said one or more rows and said one or more columns are decided based on one or more domains, the one or more domains are selected from any or combination of a clock domain, a power domain, or a performance domain.

In an example implementation, said floor plan description comprising traffic information, the number of said one or more rows and said one or more columns are optimized based on the traffic information. In an aspect, if a load of traffic is greater than 100% then said one or more rows and/or said one or more columns are added/merged (to increase the bandwidth). For example, if a load of traffic is greater than 100%, then candidate rows or columns can be merged if the combined load of traffic on candidate rows or columns to be merged is less than 50%.

In an example implementation, said step of optimizing is an iterative process involving tolerance.

In an example implementation, said floor plan description comprising chip size information, the number of said one or more rows and said one or more columns are optimized based on the chip size information. In an aspect, wherein chip size information comprising information associated with a placement of one or more wires in a gap.

In an example implementation, said floor plan description comprising router radix information and/or router arbitration frequency information, the number of said one or more rows and said one or more columns are optimized based on said router radix information and/or said router arbitration frequency information.

Figure 10:
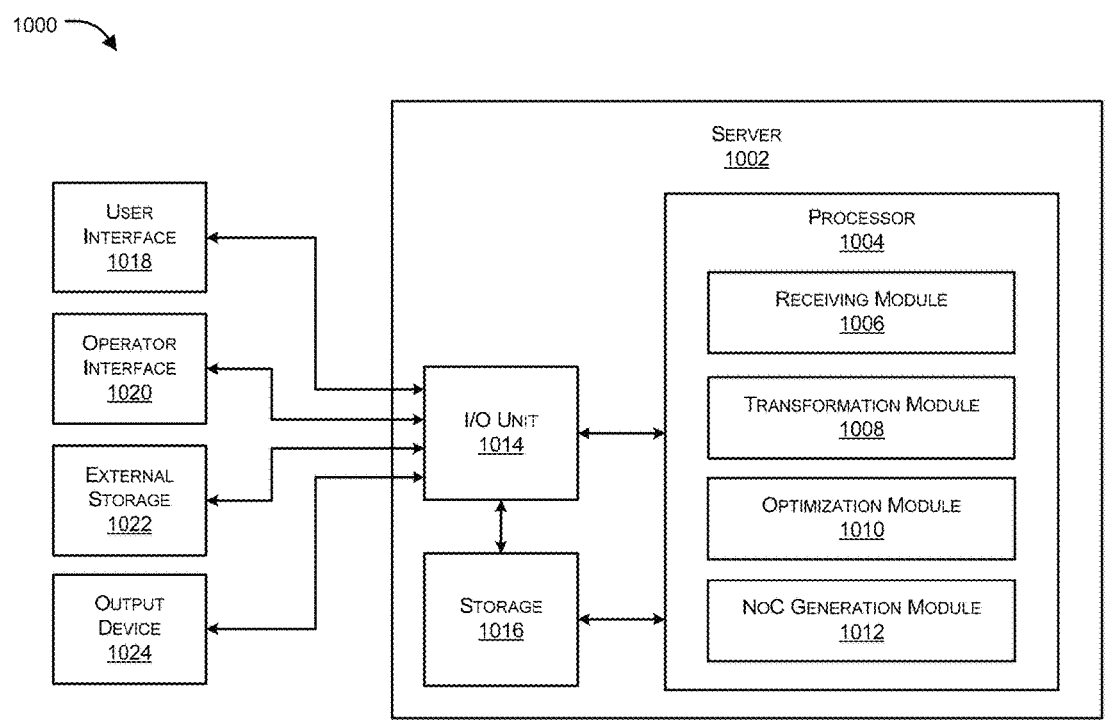
FIG. 10 illustrates an example computer system on which example implementations may be implemented.

FIG. 10 illustrates an example computer system on which example implementations may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 1000 includes a server 1002 that may involve an I/O unit 1012, storage 1016, and a processor 1004 operable to execute one or more units as known to one skilled in the art. The term "computer-readable medium" as used herein refers to any medium that participates in providing instructions to processor 1004 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1018 and operator interfaces 1020 which may utilize input devices such as a keyboard, mouse, touch device, or verbal command The server 1002 may also be connected to an external storage 1022, which can contain removable storage such as a portable hard drive, optical media (CD or DVD), disk media or any other medium from which a computer can read executable code. The server may also be connected an output device 1024, such as a display to output data and other information to a user, as well as request additional information from a user. The connections from the server 1002 to the user interface 1018, the operator interface 1024, the external storage 1016, and the output device 1024 may via wireless protocols, such as the 802.11 standards, Bluetooth® or cellular protocols, or via physical transmission media, such as cables or fiber optics. The output device 1024 may therefore further act as an input device for interacting with a user.

The processor 1004 may execute one or more modules including a receiving module 1006 a receiving module to receive at least a floor plan description of an System-on-Chips (SoC), a transformation module 1008 to transform said floor plan description into at least one logical grid layout of one or more rows and one or more columns, an optimization module 1010 to optimize a number of said one or more rows and said one or more columns based at least on any or combination of a power, an area, or a performance to obtain an optimized transformed logical grid layout, and an NoC generation module 1012 to generating said Network-on-Chip (NoC) topology at least from said optimized transformed logical grid layout.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for generating a Network-on-Chip (NoC) topology, said method comprising:
   receiving a floor plan description of a System-on-Chip (SoC);
   transforming said floor plan description into a logical grid layout comprising one or more rows and one or more columns;
   optimizing a number of said one or more rows and said one or more columns based at least on one of a power of the NoC, an area of the NoC, and a performance of the NoC to obtain an optimized transformed logical grid layout; and
   generating said Network-on-Chip (NoC) topology at least from said optimized transformed logical grid layout,
   wherein said floor plan description comprises router radix information and router arbitration frequency information, the number of said one or more rows and said one or more columns are optimized based on said router radix information and said router arbitration frequency information.

2. The method of claim 1, wherein said floor plan description comprises at least one of one or more positions of at least one host, one or more sizes of SoC, and one or more positions of at least one bridge.

3. The method of claim 1, wherein said one or more rows and said one or more columns are determined at least from one or more corners associated with one or more hosts.

4. The method of claim 1, wherein each intersection of said one or more rows and said one or more columns is indicative of a potential router location.

5. The method of claim 1, further comprising: generating one or more connections on said optimized transformed logical grid layout based at least on overlapping hosts on one or more connection paths or bridges.

6. The method of claim 1, further comprising: removing one or more connections on said optimized transformed logical grid layout based at least on overlapping hosts on one or more connection paths or bridges.

7. The method of claim 1, wherein said one or more rows and said one or more columns are decided based on one or more domains, the one or more domains comprising at least one or more of a clock domain, a power domain, and a domain determined from physical constraints.

8. The method of claim 1, wherein said floor plan description comprises traffic information, wherein the number of said one or more rows and said one or more columns are optimized based on the traffic information.

9. The method of claim 1, wherein said step of optimizing is an iterative process involving tolerance.

10. The method of claim 1, wherein said floor plan description comprises chip size information, wherein the number of said one or more rows and said one or more columns are optimized based on the chip size information, the chip size information comprising information associated with a placement of one or more wires in a gap.

11. The method of claim 1, wherein the optimizing a number of said one or more rows and said one or more columns comprises, determining a width for each of said one or more columns based on the floorplan description of the SoC, wherein a width of a first column of said one or more columns has a different width than a width of a second column of said one or more columns.

12. A non-transitory computer readable medium, storing instructions for generating a Network-on-Chip (NoC) topology, said instructions comprising:
   receiving a floor plan description of a System-on-Chip (SoC);
   transforming said floor plan description into a logical grid layout comprising one or more rows and one or more columns;
   optimizing a number of said one or more rows and said one or more columns based at least on one of a power of the NoC, an area of the NoC, and a performance of the NoC to obtain an optimized transformed logical grid layout; and
   generating said Network-on-Chip (NoC) topology at least from said optimized transformed logical grid layout;
   wherein said floor plan description comprises router radix information and router arbitration frequency information, the number of said one or more rows and said one or more columns are optimized based on said router radix information and said router arbitration frequency information.

13. The non-transitory computer readable medium of claim 12, wherein said floor plan description comprises at least one of one or more positions of at least one host, one or more sizes of SoC, and one or more positions of at least one bridge.

14. The non-transitory computer readable medium of claim 12, wherein said one or more rows and said one or more columns are determined at least from one or more corners associated with one or more hosts.

15. The non-transitory computer readable medium of claim 12, wherein each intersection of said one or more rows and said one or more columns is indicative of a potential router location.

16. The non-transitory computer readable medium of claim 12, the instructions further comprising: generating one or more connections on said optimized transformed logical grid layout based at least on overlapping hosts on one or more connection paths or bridges.

17. The non-transitory computer readable medium of claim 12, the instructions further comprising: removing one or more connections on said optimized transformed logical grid layout based at least on overlapping hosts on one or more connection paths or bridges.

18. The non-transitory computer readable medium of claim 12, wherein said one or more rows and said one or more columns are decided based on one or more domains, the one or more domains comprising at least one or more of a clock domain, a power domain, and a domain determined from physical constraints.

* * * * *